Nov. 16, 1937.    A. L. FARMER    2,099,263
TRAILER BRAKE SYSTEM
Filed Aug. 20, 1934    3 Sheets-Sheet 1
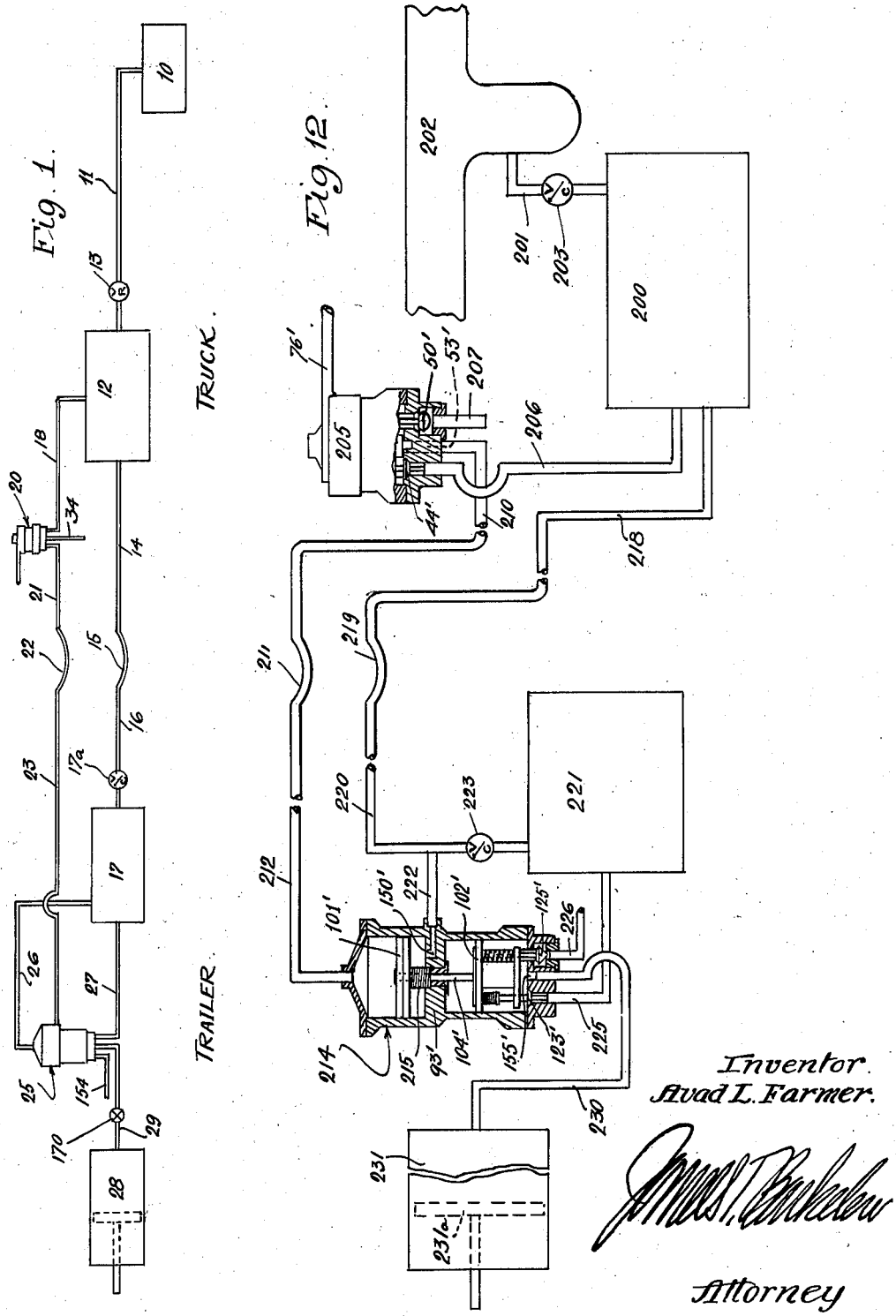
Inventor.
Avad L. Farmer.
Attorney Nov. 16, 1937.  A. L. FARMER  2,099,263
TRAILER BRAKE SYSTEM
Filed Aug. 20, 1934  3 Sheets-Sheet 2
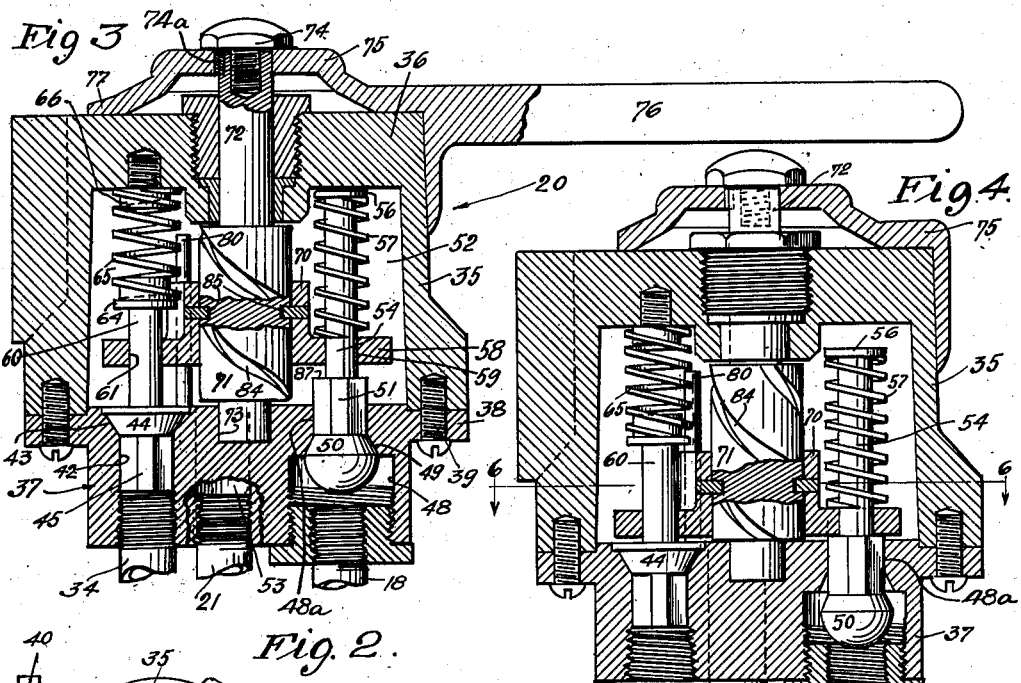
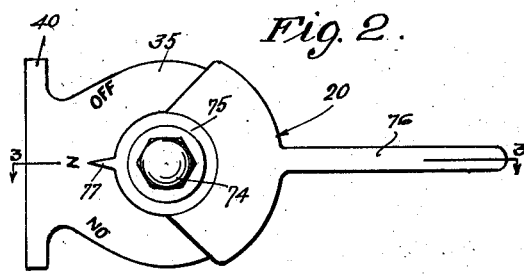
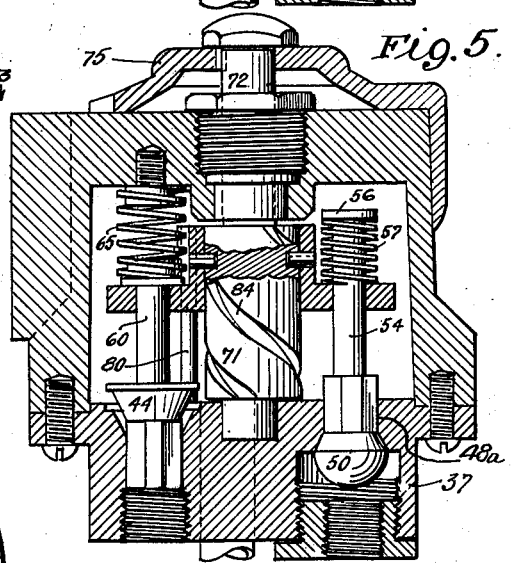
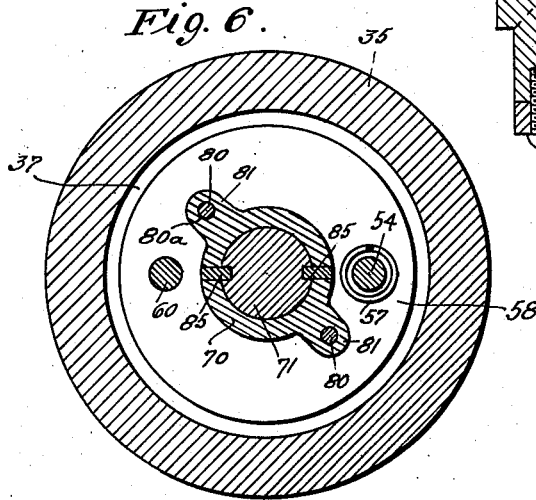
Inventor.
Avad L. Farmer.
Attorney.

Nov. 16, 1937.  A. L. FARMER  2,099,263
TRAILER BRAKE SYSTEM
Filed Aug. 20, 1934   3 Sheets—Sheet 3
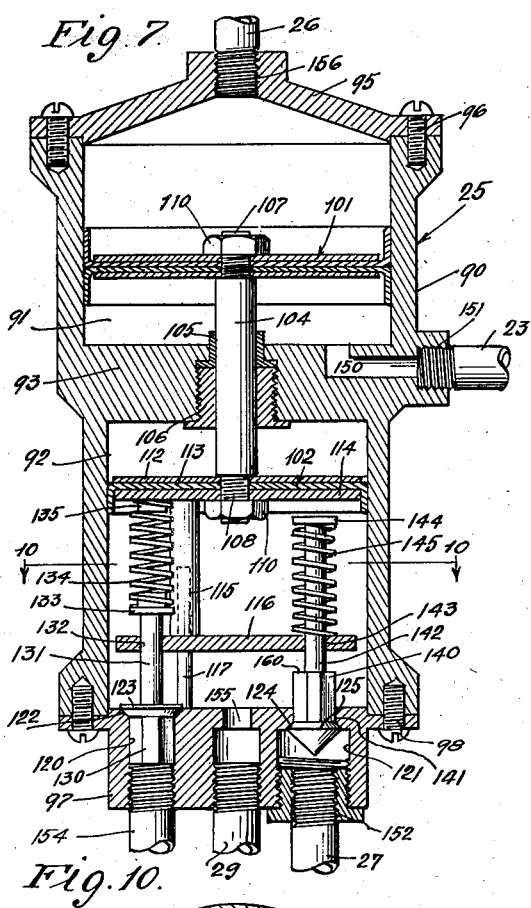
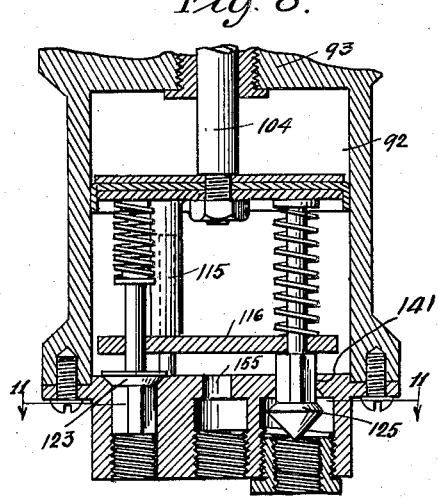
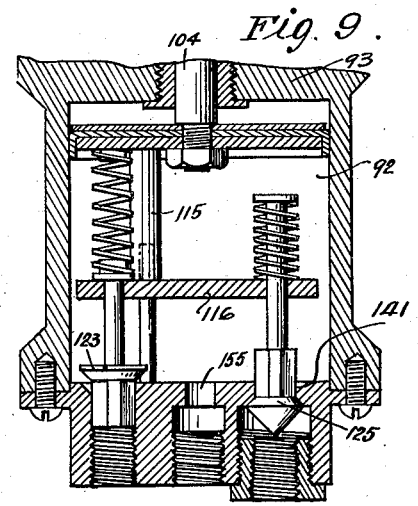
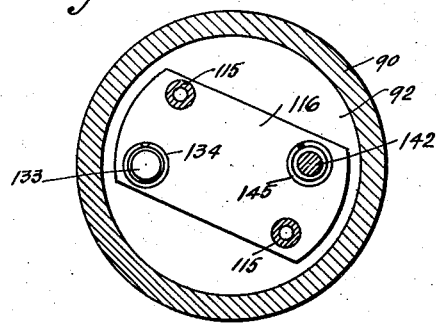
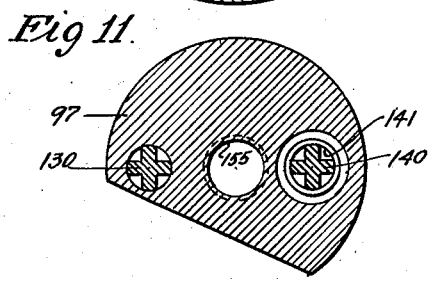
Inventor.
Avad L. Farmer.
Attorney.

Patented Nov. 16, 1937

2,099,263

UNITED STATES PATENT OFFICE 2,099,263

TRAILER BRAKE SYSTEM

Avad L. Farmer, Los Angeles, Calif.

Application August 20, 1934, Serial No. 740,546

30 Claims. (Cl. 303—26)

This invention relates generally to air brake systems for vehicle trains, and it may be stated as a general object of the invention to provide an improved and simplified air brake system for a vehicle train such as a truck and trailer.

Fluid pressure brake systems for vehicle trains have heretofore been either of the "straight air" type, in which the brake cylinders are connected through a hand control valve with a source of compressed air, or of the "automatic" type, in which operation of a hand control valve releases pressure in a control line, thereby operating an automatic valve device to cause compressed air stored in an auxiliary tank on the trailer to be introduced to the brake cylinders.

It has generally been considered in the past that the straight air system was in many points superior to the automatic system for short trains, as for instance a truck and trailer installation, for the reason of its greater simplicity, and also for the ease by which application and release of the brakes could be graduated by the operator. Straight air systems, however, do not have the important feature of emergency application of brakes in the event of the trailing vehicle breaking away from the hauling vehicle. It is well known that this emergency application feature is an inherent characteristic of the automatic system, wherein release of air from the connecting control line, as would occur due to a break in said line, causes the breaks to be instantly applied. Accordingly, it has been usual in the past to utilize a combined straight air and automatic system, straight air braking being relied on for all service stops, and automatic braking being utilized for emergency stops, and also coming into play automatically in the event of trailer break-away. Obviously, it is not necessary in such systems that the automatic side be adapted for nicely graduated application and release of the brakes, and the automatic side of such systems has accordingly not been designed for such use.

It is a primary object of the present invention to provide a vehicle-train air brake system of the so-called "automatic" type, which is exceptionally simple and eminently practicable for truck and trailer installation, and which at the same time provides nicely graduated control of braking effort both in application and release of brakes.

It is a further object of the invention to provide novel valve devices for the brake system which are simple, trustworthy, and generally improved as regards both design and operation.

In the preferred form of the braking system there is provided a main air pressure reservoir and a hand control valve on the hauling vehicle, and an auxiliary air pressure reservoir and a remote control valve on the trailing vehicle, and the brakes are applied by operating the hand control valve to lower pressure in a connecting control line, which causes the remote control valve to pass air from the auxiliary reservoir to the brake cylinders, in general, in the usual manner. The special hand and remote control valves which are characteristic of the present invention, and the particular nature of the novel interconnections therebetween, as well as the greatly improved braking operation obtainable therewith, will best be left to be discussed in the body of the specification.

The same novel hand and remote control valves as used in my "automatic" air pressure system outlined above, are also generally adapted for incorporation in an alternative vacuum brake system, the remote control valve needing only a small modification to suit it to such use. The characteristics of my vacuum brake system involving use of these same valve devices will also be more fully discussed hereinafter.

The invention will now be more fully understood by referring to the following detailed description of present preferred embodiments thereof, reference for this purpose being had to the accompanying drawings, in which:

Fig. 1 indicates diagrammatically my automatic air brake system for a truck and trailer train;

Fig. 2 is a top plan view of the hand control valve;

Fig. 3 is a vertical section taken on line 3—3 of Fig. 2 and showing the valve in "neutral" position;

Fig. 4 is a view similar to Fig. 3 but showing the valve in "intake" position;

Fig. 5 is a view similar to Fig. 3 but showing the valve in "exhaust" position;

Fig. 6 is a section taken as indicated by line 6—6 of Fig. 4;

Fig. 7 is a vertical medial section of the remote control valve, the valve being shown in "neutral" position;

Fig. 8 is a view showing a portion of the valve of Fig. 7 and showing the parts in brake applying position;

Fig. 9 is a view similar to Fig. 8 but showing the parts in brake releasing position;

Fig. 10 is a section taken on line 10—10 of Fig. 7;

Fig. 11 is a detail section taken on line 11—11 of Fig. 8; and

Fig. 12 is a diagrammatic view of my alternative "vacuum brake" system for a truck and trailer train.

Since the present invention concerns only the trailer brake, the truck brake provisions are omitted from the drawings; it will be obvious, however, that the air compressor on the truck may serve both the trailer and truck braking systems. The air compressor on the truck is designated at 10, and is shown connected by pipe line 11 with main air pressure reservoir 12. It is sometimes desirable that the air compressor be operated to supply air at a considerably higher pressure than is suitable for use in the trailer brake system; for instance, air at a maximum pressure of 30 lbs. may be suitable for the trailer brake system, while it may be desirable that the compressor supply air at approximately 100 lbs. pressure for use in the truck brake system. In such event a pressure reducing valve 13 is placed in line 11 just ahead of main air pressure reservoir 12, and this reducing valve will be adjusted to supply air at the desired pressure to reservoir 12, as will be understood.

From reservoir 12 a brake pressure line 14 extends to the rear end of the truck, and is coupled at 15 to brake pressure line 16 on the trailer, said line 16 leading to the auxiliary air pressure reservoir 17 which is mounted on the trailer. A check valve 17a is provided in brake pressure line 16 on the trailer just ahead of reservoir 17, so that the pressure in 17 will be held in the event of breakage of the pressure line between the truck and trailer. A control line 18 leads from the main reservoir 12 to hand control valve 20, which is in convenient reach of the operator of the truck, and from valve 20 a pressure control line 21 extends to the rear end of the truck, where it is coupled, as at 22, to a pressure control line 23 on the trailer, this line 23 leading to the remote control valve 25. A pressure line 26 leads from auxiliary reservoir 17 to the top end of remote control valve 25, and a pressure line 27 leads from reservoir 17 to the lower end of said valve 25. Numeral 28 designates a brake cylinder, which is operated by air under pressure supplied to line 29 which leads from the lower end of remote control valve 25.

Hand control valve 20 is shown in detail in Figs. 2 to 6, inclusive. This valve has three positions, one in which air is passed from line 18 straight through to control line 21, a second in which line 18 is blanked and line 21 is permitted to exhaust through the valve and through a discharge pipe 34 to atmosphere, and a third or "neutral" position, in which supply line 18 is blanked and at the same time the pressure in control line 21 is held. The valve has a hollow body 35 provided with an integral upper head 36 and a removable valve base 37, the latter being provided with annular flange 38 which engages the lower end of body 35 and is secured thereto by means of screws 39. The valve body is shown provided with a flange 40 through which it may be mounted on any suitable support.

Valve base 37 is provided on one side of center with a through air passage 42 formed at its upper end with a conical valve seat 43 for a downwardly and outwardly seating conical valve 44, this valve being shown provided with a downwardly extending fluted guide stem 45 which fits and slides in passage 42. Valve head 37 is also provided, on the side of center opposite said passage 42, with a through air passage 48 which has formed therein a conical seat 49 for an upwardly and inwardly seating conical valve 50, this valve being provided with an upwardly extending fluted guide stem 51 which fits and slides in air passage bore 48a, and is adapted to project above the upper surface of base 37 when the valve is seated. Air supply line 18 is connected with air passage 48, and a discharge line 34, which opens to atmosphere, is connected with air passage 42, so that lines 18 and 34 have valve controlled communication with the interior chamber 52 of the valve body. Valve base 37 is provided with a third through air passage 53, to which is connected control line 21, so that the control line is in constant communication with interior valve chamber 52.

Valve 50 has an upwardly extending stem member 54 of diameter less than part 51, having on its upper end a head or flange 56, below which is confined a compression valve spring 57 which bears downwardly on the upper side of a valve abutting or operating plate 58, stem 54 passing freely through an aperture 59 in said plate 58. Valve 44, which is diametrically opposite to valve 50, is provided with an upwardly extending stem 60 which passes freely through an aperture 61 formed in the opposite edge of plate 58, and this stem has on its upper end a head or flange 64, on which is seated the lower end of a compression valve spring 65, the upper end of which engages valve head 36 and is positioned by means of a screw 66 set therein, in the manner indicated.

Plate 58 is formed with a central upwardly extending hub or sleeve portion 70 which surrounds and is vertically slidable on a cylindrical cam member 71 provided on a central rotatable valve operating spindle 72. The lower end of spindle 72 is received and has bearing in a socket or step bearing 73 formed in the upper surface of valve base 37, and the upper end of said spindle extends upwardly through head 36, suitable bearings being provided in said head so that the spindle is free for rotation. Fastened, as by screw 74 and key 74a, on the upper end of spindle 72 is the hub portion 75 of an operating handle 76, this hub portion 75 being conveniently provided with an indicating pointer 77 adapted to point to different operating position designations which may be inscribed on the upper surface of the valve body as in the manner illustrated in Fig. 2.

Valve actuating plate 58 is guided for movement along the axis of valve operating spindle by means of a pair of vertical guide pins 80 fastened to valve base 37 and passing freely through bores 80a in bosses 81 which are formed integrally with plate 58 and its hub portion 70 (Fig. 6). Plate 58 is moved vertically as valve spindle 72 is rotated, through the medium of a pair of spiral cam grooves 84 cut in the periphery of spindle section 71 and engaged by follower pins 85 which are carried by and extend inwardly from hub member 70, pin members 85 being formed to fit the spiral cam grooves. It will be evident that rotation of spindle 72 by operation of handle 76 will cause plate member 58 to move vertically on spindle section 71 by reason of the coaction of cam grooves 84 with follower pins 85.

It will be seen that in the neutral position of Fig. 3 valve actuating plate 58 is spaced a short distance below the head or flange 64 of valve stem 60 and a short distance above the shoulder 87 provided at the juncture of fluted valve stem portion 51 with reduced stem member 54 of intake valve 50. Plate 58 thus has a limited range of vertical movement (between flange 64 and shoulder 87) within which valves 44 and 50 are undisturbed thereby and remain seated on their valve seats under the influence of their respective valve springs, and this range may be termed the neutral range of the valve. The valve being in the position of Fig. 3, operation of handle 76 to rotate valve spindle 72 to the right causes action through cam grooves 84 and pins 85 to lower valve actuating plate 58 into engagement with valve shoulder 87 to unseat valve 50 against its spring 57, as indicated in Fig. 4; and when handle 76 is operated to rotate spindle 72 to the left from the described neutral position, valve actuating plate 58 is raised and engages valve stem flange 64 to lift valve 44 against its spring 65, as indicated in Fig. 5. It is to be noted that valve actuating plate 58 is positively moved from and returned to the neutral position of Fig. 3 in opening and closing both of valves 44 and 50.

Thus, in the valve position of Figs. 2 and 3, herein referred to as neutral position, both of valves 44 and 50 are closed, and air supply line 18 is therefore blanked and the pressure in control line 22 is held; in the position of Fig. 4, intake valve 50 is open and air from supply line 18 is passed through to control line 21; and in the position of Fig. 5 valve 50 is closed to blank supply line 18, and valve 44 is lifted to permit air from the control line to flow through the valve body and past valve 44, to discharge through line 34 to atmosphere.

The remote control valve 25 is shown in detail in Figs. 7 to 11, inclusive. This valve 25 embodies a body 90 providing vertical axially alined piston chambers 91 and 92 separated by an intermediate head 93. The body is provided with a removable cap 95, which closes the upper end of chamber 91, and is secured to the valve body by screws 96, and with a lower valve base 97, which closes the lower end of chamber 92 and is secured to the valve body by screws 98. Upper piston chamber 91 is preferably of greater diameter than lower piston chamber 92, as indicated; for instance, though without intention of limiting the invention to such dimensions, if the interior diameter of upper piston chamber 91 is 3", the interior diameter of lower piston chamber 92 may be 2½". Pistons 101 and 102 work within chambers 91 and 92, respectively, and are connected together by a rod 104 which passes through partition 93. A leather packing ring 105 and a packing bushing 106 are placed in partition 93 around rod 104 to prevent leakage of air between chambers 91 and 92. Pistons 101 and 102 are mounted on the reduced and screwthreaded upper and lower extremities 107 and 108, respectively, of rod 104, and are fastened in place by nuts 110. The upper end of lower chamber 91, above piston 102, is preferably open to atmosphere.

Piston 102 is made up of an upper disc 112, a cup leather 113 immediately below disc 112, and a plate 114 adjacent the lower surface of cup leather 113, nut 110 holding said parts in assembly. Plate 114 has formed integrally therewith a pair of hollow depending posts 115 (see Fig. 10), which have on their lower ends an integrally formed horizontal valve actuating plate 116. Vertical guide rods 117 are set in valve base 97 and extend upwardly through the bores of hollow posts 115 to guide valve actuating plate 116 in its vertical movement with piston 102.

Valve base 97 is provided on opposite sides of its center with through air passages 120 and 121, passage 120 being formed with a conical seat 122 for a downwardly and outwardly seating conical valve 123, and passage 121 being formed with a conical seat 124 for an upwardly and inwardly seating conical valve 125. Valve 123 is provided with a fluted downwardly extending guide stem portion 130, and with an upwardly extending valve stem 131. This valve stem 131 passes freely through an aperture 132 in plate 116 and has on its upper end a head or flange 133, which provides a seat for the lower end of a compression valve spring 134, the upper end of which seats against the underside of piston 102 and is positioned by a depending lug 135 formed thereon. Valve 125 has an upwardly extending fluted guide stem 140 which fits air passage bore 141 and projects above the upper surface of valve base 97, and extending upwardly from fluted stem portion 140 is a reduced valve stem 142. This stem 142 passes freely through an aperture 143 in valve actuating plate 116, and has on its upper end a head or flange 144, below which is confined the upper end of a compression valve spring 145, the lower end of which bears downwardly on plate 116. It will be evident that in the neutral valve position of Fig. 7, springs 134 and 145 act to hold their respective valves in closed position.

Air from control line 23 is introduced to the valve body in such a manner as to act constantly on the lower side of upper piston 101. In the present instance this is accomplished by providing an air passage 150 in valve body partition 93, one end of which opens through the top side of said partition, and the other end of which opens through the side of the valve body and is connected at 151 with control line 23. The brake pressure line 27 which leads from auxiliary reservoir 17 is connected at 152 with air passage 121 which is controlled by upwardly seating valve 125. The air passage 120 in valve base 97, which is controlled by downwardly seating valve 123, is connected to a pipe 154 which discharges to atmosphere. Valve base 97 is provided with a third air passage 155 opening to the interior of chamber 92, and connected thereto is pipe line 29 leading to brake cylinder 28. Air pressure from auxiliary reservoir 17 is constantly applied against the upper side of upper piston 101. In the present instance, a separate pipe 26 leads air from reservoir 17 and is connected at 156 to a threaded port extending through the upper end of valve cap 95. This provision constantly biases the piston to move in a downward direction.

It will be noted that in the neutral position of Fig. 7, valve actuating plate 116 is spaced a short distance below valve stem flange 133 and a short distance above shoulder 160 provided at the juncture of fluted valve stem portion 140 with reduced valve stem member 142, thus providing a limited range of vertical movement from the piston and valve actuating plate 116 without operatively engaging either flange 133 or shoulder 160. When pistons 101 and 102 lower from the position of Fig. 7, plate 116 finally engages shoulder 160 to unseat valve 125 against its springs; and when the pistons rise above the position of Fig. 7, plate 116 finally engages flange 133 to lift and unseat valve 123 against its spring.

The operation of the brake system is as follows: When the brakes are in released position, hand operating valve 20 is in the position of Fig. 4, handle 76 being moved over until pointer 77 indicates "off", with valve 50 unseated and valve 44 seated.

Air from reservoir 12 accordingly is free to flow from line 18 through the valve body into control line 21, 23 and thence through air passage 150 to act on the underside of upper piston 101. At the same time air from auxiliary reservoir 17, which is at the same pressure as the air in reservoir 12, and is therefore at the same pressure as the air which is acting on the underside of piston 101, is introduced by way of line 26 to piston chamber 91 and acts downwardly on the upper side of piston 101. The pressures on the upper and lower sides of piston 101 are thus equal, except for the slight differential due to the cross-sectional area of rod 104, and the pair of pistons 101, 102 accordingly take a neutral position which is determined by valve springs 134 and 145, it being evident that said springs act in opposite directions on the piston assembly and accordingly tend to move the pistons to a position in which spring 145 plus the downward pressure differential on the piston due to rod 104 is balanced by spring 134. This position is the neutral position of Fig. 7, with valve actuating plate 116 about midway between flange 132 and shoulder 160. The valve 125 which controls admission of air under pressure from auxiliary reservoir 17 is at this time being held closed by springs 145, and it will be evident that the air pressure against the lower side of said valve also tends to hold it up against its seat. Valve 123 is at the same time held seated under the influence of its spring 134.

When it is desired to apply the brakes, handle 76 of hand valve 20 is moved through neutral, which closes valve 50 and so cuts off the supply of pressure air, and is then moved momentarily to "on" position, thus opening valve 44 and permitting a quantity of air from the control line to discharge through the valve body and pipe 34 to atmosphere. For instance, assuming normal pressure of 30 lbs. in the main and auxiliary reservoirs, and therefore on both sides of piston 101 and in the control line, handle 76 may be held in the last described position just long enough, say, to allow a reduction of 10 lbs. in the pressure in the control line and below piston 101, after which handle 76 may be returned to neutral. In this position (neutral), valves 44 and 50 are both closed, so that a pressure of 20 lbs. will be held below piston 101. The reduction of pressure below piston 101 then causes said piston to descend, moving lower piston 102 and valve actuating plate 116 downwardly until plate 16 engages valve stem shoulder 160 and unseats valve 125 (Fig. 8), and so permits flow of air from auxiliary reservoir 17 through line 27 into lower piston chamber 92, and thence out through passage 156 and line 29 to the brake cylinders.

This flow of air continues until the air pressure so let into chamber 92 acts upwardly on the lower side of piston 102 with a force which is sufficient just to overcome the differential on upper piston 101 created by the drop in pressure below it, at which time pistons 101 and 102 move upwardly and so allow valve 125 to close. In this upward movement the pistons do not rise on up to the position of Fig. 9, since the overbalancing force below piston 102 which is causing the pistons to rise is not great, valve 125 closing before substantial excess force is developed; the upward movement of the pistons is therefore arrested by compression of valve spring 145 before plate 116 reaches valve stem flange 133.

Thus by virtue of the lowering of pistons 101 and 102 and the opening of valve 125, air from the auxiliary pressure tank flowed through the valve body and into the brake cylinder, building up a certain pressure therein and causing the brakes to be applied with a certain force depending upon the length of time valve operating handle 76 was held in "on" position, and therefore upon the amount by which the pressure in the control line and below piston 101 was reduced.

A further operation of valve handle 76 to still further depress the pressure in the control line will then cause another lowering of remote control valve pistons 101 and 102, and therefore a further opening of valve 125 to increase the pressure in the brake cylinders, followed by another return upward movement of pistons 101 and 102 when valve handle 76 is returned to neutral position and the pressure below piston 102 again overcomes the downward force on piston due to the differential of pressures thereon. Thus the pressure in the brake cylinders may be built up by successive operations of valve control handle 76 between "on" position and neutral, and so may be built up gradually until the desired braking effort is obtained. With achievement of skill by the operator, he will not, however, ordinarily increase the braking effort by a succession of operations of the valve handle, but will at once by a single operation of the valve handle build up the pressure in the brake cylinders to cause a relatively heavy application of the brakes, and may then reduce the pressure in the brake cylinders as speed is reduced, in the manner hereinafter to be explained.

When an emergency stop is to be made, valve handle 76 is moved over to "on" position and left there, so as to exhaust all of the pressure air from the control line and reduce the pressure below piston 101 to atmosphere pressure. This of course causes pistons 101 and 102 to descend and open valve 125, as before. Now it will be observed that with pistons 101 and 102 in this lowermost position (Fig. 8), the force tending to raise the pistons is the pressure of the air let in through valve 125 and acting on the bottom of piston 102, plus the upward force exerted on the piston by the compressed valve spring 134. And if piston 102 were of the same area as piston 101, the pistons would tend to rise before the full pressure available from pressure reservoir 17 had built up in the brake cylinder, since air at the maximum pressure acting downwardly on piston 101 would be equalized and overcome by air at somewhat less pressure acting upwardly on piston 102 plus the upward force exerted on piston 102 by spring 134. Consequently, so that the pistons will not rise until the maximum pressure available has built up below piston 102, piston 102 is made of reduced area, such that the total upward force on said piston, including the force exerted by spring 134, will not overcome the downward force on piston 101 until the full pressure available has been built up in the brake cylinder. By making piston 102 sufficiently small, and choosing a spring 134 of proper strength, it is possible to maintain the pistons down in the brake applying position of Fig. 8 when the control line pressure is completely exhausted, such a condition obtaining when the upward force on piston 102 due to the compression of spring 134 plus the upward force due to the maximum air pressure on the underside of piston 102 is not sufficient to overcome the downward force of the pressure air on the top side of piston 101. In such an instance valve 125 is held open and the pressure from auxiliary tank 17 is maintained in continual communication with the brake cylinder. This last is the preferred form of the system.

When the brakes are to be released, the pressure in the brake cylinder is exhausted by moving hand control valve 76 over to "off" position, valve 20 then being in the position of Fig. 4, with exhaust valve 44 closed and intake valve 50 open. Air under pressure from main reservoir 12 then flows through valve 20 into control line 21, 23, and builds up the pressure below remote control valve piston 101. Assuming now that the valve handle is left in "off" position sufficiently long to build the pressure below piston 101 back up to the same maximum pressure as the air which is acting downwardly on piston 101, the pressures on the two sides of said pistons will be substantially balanced (except of course for the small differential due to the area of rod 104), and the pressure of the air below piston 102, which is the same as the pressure in the brake cylinder, will move the pistons to the extreme upper "release" position illustrated in Fig. 9, the upward force on the pistons under such circumstances being sufficient to cause compression of valve spring 145. In moving to this latter position, valve actuating plate 116 engages flange 133 on the stem of valve 123 and lifts and unseats said valve against its spring 134. The air in the brake cylinder then discharges through line 29, valve chamber 92, and line 154 to atmosphere. This exhaustion of air from the brake cylinder continues until the pressure below piston 102 has been reduced substantially to atmospheric pressure, when valve spring 145 acts to move the piston back down to the neutral position of Fig. 7. The brake system is then back to its original condition, valves 123 and 125 both being closed.

It is also possible to effect a gradual release of the brakes by moving valve handle 76 momentarily to "off" position and then back to neutral, so that at first the pressure below piston 101 is built up say just a few pounds above atmospheric. The resulting increase in upward force on the pistons is then sufficient to move them upwardly momentarily to the release position of Fig. 9, in which air begins to discharge from the brake cylinders past valve 123, which is then unseated. The immediately resulting reduction of pressure below piston 102 then decreases the upward force on the pistons, and when the resultant upward component of force on the pistons due to pressure of air then falls below the value necessary to hold them in their uppermost release position against the force of valve spring 145, the pistons move back down to the neutral position of Fig. 7, only a part of the pressure in the brake cylinder having been released. It will thus be obvious that by a succession of operations of valve handle 76 between "off" position and "neutral" the pressure in the brake cylinders can be very gradually released.

From what has now been said it will be evident that the brakes may be applied in ordinary service with nicely graduated control, both in application and in release. It will likewise be evident that in the event of trailer "break-away", breakage of the control line 23 will allow exhaustion of air below the remote valve piston 101, and will thus cause an immediate emergency application of the brakes. In the event of such breakage of the control line and emergency application of the trailer brake, it will of course be impossible to release the trailer brakes by the usual method of increasing the pressure in the control line. I accordingly provide a three-way pet-cock 170 in the line 29 between the remote control valve and the brake cylinder, this pet-cock normally allowing the air to flow through line 29, but being adapted to be operated to discharge the air which is being held in the brake cylinder to atmosphere.

Attention is directed to the fact that the pistons have a definite range of travel between the points at which the intake and exhaust valves are opened. This provision is of importance as it permits piston 102 to return to neutral or intermediate position from its air admitting position at the lower end of its chamber, for instance, without over-traveling and opening the exhaust valve. Likewise, this intermediate neutral range permits the piston to descend from its upper air-exhausting position without over-traveling and opening the air intake port.

In Fig. 12 I show my vacuum type brake system, which embodies the same valve devices utilized in my previously described pressure brake system. In Fig. 12, numeral 200 designates the vacuum tank on the truck or hauling vehicle, said tank being exhausted through line 201 which communicates with the intake manifold 202 of the hauling vehicle engine, line 201 being provided with check valve 203. Numeral 205 designates the hand control valve, which may be exactly the same as hand control valve 20 of the air pressure system previously described. For convenience, reference numerals applied to valve 205 are the same as those applied to valve 20, but with primes annexed. 206 is a line leading from vacuum tank 200 to the air port of valve 205 which is controlled by outwardly seating conical valve 44'. The port of valve 205 which is controlled by inwardly seating conical valve 50' has connected thereto an exhaust pipe 207 discharging to atmosphere. The through port 53' of valve 205 has connected thereto a control line 210, which is coupled at 211 to control line 212 on the trailing vehicle, this control line 212 opening into the upper end of the upper chamber of remote control valve 214. Valve 214 is substantially the same as remote control valve 25 of the previously described air pressure brake system, and for convenience members of valve 214 corresponding to similar members of valve 25 will be given the same reference numerals but with primes annexed. The only difference between remote control valve 25 of the system of Fig. 1 and remote control valve 214 shown in the system of Fig. 12 is the addition in valve 214 of compression spring 215 surrounding piston rod 104' and acting between partition 93' and the underside of upper piston 101'.

Numeral 218 designates vacuum line leading from main vacuum tank 200 and coupled at 219 to vacuum line 220 on the trailer, said vacuum line 220 leading to auxiliary vacuum tank 221 mounted on the trailer. A branch line 222 leading from vacuum line 220 connects with air passage 150' which opens into the upper piston chamber below piston 101'. A check valve 223 is provided between the juncture of line 220 and 222 and auxiliary tank 221, as indicated. The air port of remote control valve 214 which is controlled by outwardly seating conical valve 123' has connected thereto a line 225 which leads to auxiliary vacuum tank 221. The air port in said valve which is controlled by inwardly seating conical valve 125' has connected thereto an exhaust pipe 226 which discharges to atmosphere. Connected to the air passage 155' which opens into the lower chamber of valve 214 is a line 230 which leads to brake cylinder 231.

The brakes are in release position when the valves are in the position indicated in Fig. 12, conical valve 44' of hand control valve 205 being seated and conical valve 50' of said valve being unseated, and pistons 101' and 102' of remote control valve 214 being in their lowermost positions, with conical valve 125',held unseated. The usual pressure depression within manifold 202 exhausts the air from main and auxiliary tanks 200 and 221, check valves 203 and 223 maintaining the vacuum produced in said tanks. The same reduced pressure exists below remote control valve piston 101' due to exhaustion through pipe 222. The outer surfaces of pistons 101' and 102' are exposed to air at atmosphere pressure.

To apply the brakes, valve operating handle 76' is operated to seat valve 50' and to unseat valve 44', which has the effect of reducing the pressure in remote control valve 214 above piston 101' to a value below atmospheric, the air passing by way of control line 212, 210 and the inner chamber of valve 205 to line 206 and main vacuum tank 200. The resulting reduction of pressure above piston 101' allows pistons 101' and 102' to rise under the upward force exerted by spring 215, and in so doing allows valve 125' to close and then acts to open valve 123' as the uppermost piston position is reached. In such position air flows from the brake cylinder 231 through line 230 to the lower chamber of the remote control valve, and then past unseated valve 123' into line 225 to auxiliary vacuum tank 221. Pressure within the brake cylinder 231 thus being reduced, brake cylinder piston 231a is moved to apply braking effort.

This flow of air from brake cylinder 231 to auxiliary vacuum tank 221 causes a reduction of pressure in the lower chamber of remote control valve 214 below piston 102', and when the upward force on piston 102' has thereby been sufficiently reduced, pistons 101' and 102' will descend to a neutral or intermediate position, with both valves 123' and 125' closed. In such a position the vacuum produced in the brake cylinder is held at a constant value. A further reduction of pressure above 101' by operation of hand valve control handle 76' to unseat vacuum control valve 44' will then cause a further rise of pistons 101' and 102' to effect another unseating of conical valve 123' and therefore a further reduction of pressure in brake cylinder 231 and a stronger application of the brakes.

When it is desired to release the brakes, hand valve operating handle 76' is moved to unseat conical valve 50', whereupon atmospheric air flows in through line 207 and builds the pressure in control line 210, 212 and the upper side of the upper chamber of remote control valve 214 back up to atmospheric pressure, whereupon pistons 101' and 102' descend to the release position illustrated in Fig. 12, with valve 125' unseated. In the latter position air flows in through pipe 226 and passes by way of line 230 to build the pressure in brake cylinder 230 back up to atmospheric, thus allowing piston 231a to retract to release the brakes.

While I have shown and described present preferred forms of my invention, such disclosure is intended to be illustrative rather than limitative upon the broader claims appended hereto, for various changes in construction and arrangement may be made without departing from the spirit and scope of my invention and of the appended claims.

I claim:

1. A remote control valve for a fluid pressure brake system, comprising a valve body having piston chambers separated by an intermediate partition, a pair of mechanically interconnected pistons, one working in each of said chambers, there being an intake port, an exhaust port, and a brake chamber port in the valve body communicating with the outer end of one of the piston chambers, and an air port communicating with the inner portion of the other piston chamber through which the pressure on the inner side of the piston in said chamber can be controlled, means for maintaining a pressure on the opposite side of said piston, a pair of spring-closed valves controlling the intake and exhaust ports, and valve operating means moving with that piston which is in the valved piston chamber adapted to release both said valves to be closed by their respective springs throughout a limited extent of travel of said piston near the central portion of its stroke, to open the inlet port valve as the piston moves to the outer end of its stroke and to open the exhaust port valve as the piston moves to the inner end of its stroke.

2. A remote control valve for a fluid pressure brake system, comprising a valve body having piston chambers separated by an intermediate partition, a pair of mechanically interconnected pistons, one working in each of said chambers, yielding means acting in both directions on said pistons to tend to move them toward normal intermediate position in their respective chambers, there being an intake port, an exhaust port, and a brake chamber port in the valve body communicating with the outer end of one of the piston chambers, and an air port communicating with the inner portion of the other piston chamber through which the pressure on the inner side of the piston in said chamber can be controlled, means for maintaining a pressure on the opposite side of said piston, a pair of normally closed valves controlling the intake and exhaust ports, and means moving with that piston which is in the valved piston chamber adapted to release and allow both said valves to close throughout a given extent of travel of said piston in the vicinity of said normal position, to open the intake port valve as said piston moves to the outer end of its stroke and to open the exhaust port valve as the piston moves to the inner end of its stroke.

3. A remote control valve for a fluid pressure brake system, comprising a valve body having piston chambers separated by an intermediate partition, a pair of mechanically interconnected pistons, one working in each of said chambers, there being a pair of air ports in the valve body at the outer end of one of said chambers, an outwardly seating valve controlling one of said air ports, an inwardly seating valve controlling the other of said air ports, a pair of compression springs in said last mentioned chamber acting to hold said valves normally closed, one of said springs being arranged to act on the pistons to tend to move them in one direction in their chambers, and the other of the springs being arranged to act on the pistons to tend to move them in the other direction in their chambers, whereby said pistons are urged to move toward an intermediate neutral position, valve operating means moving with that piston which is in the valved piston chamber adapted to release and allow both said valves to close throughout a given neutral range of travel of said piston in the vicinity of said intermediate position, to unseat the inwardly seating valve when that piston has travelled past the outer limit of said neutral range in movement toward the outer end of its stroke and to unseat the outwardly seating valve when that piston has travelled past the inner limit of said neutral range in movement toward the inner end of its stroke, and there being a brake chamber port in the valve body opening into the outer end of the valved piston chamber, a control air port communicating with the inner end portion of the other piston chamber, and means for applying a pressure on the outer side of the piston in the last mentioned piston chamber.

4. A remote control valve for a fluid pressure brake system, comprising a valve body having piston chambers separated by an intermediate partition, one of said chambers being of larger diameter than the other, a pair of mechanically interconnected pistons, one working in each of said chambers, there being an air port opening into the larger diameter piston chamber through which the pressure on the inner surface of the piston in said chamber can be controlled, and an air port opening into the outer portion of said chamber through which pressure may be applied to the outer side of said piston, and there being a pair of air ports in the valve body at the outer end of the other piston chamber, an outwardly seating valve controlling one of said air ports, an inwardly seating valve controlling the other of said air ports, a pair of compression springs in said last mentioned chamber acting to hold said valves normally closed, one of said springs being arranged to act on the pistons to tend to move them in one direction in their chambers, and the other of the springs being arranged to act on the pistons to tend to move them in the other direction in their chambers, whereby said pistons are urged to move toward an intermediate neutral position, valve operating means moving with that piston which is in the valved piston chamber adapted to release and allow both said valves to close throughout a given neutral range of travel of said piston in the vicinity of said intermediate position, to unseat the inwardly seating valve when that piston has travelled past the outer limit of said neutral range in movement toward the outer end of its stroke and to unseat the outwardly seating valve when that piston has travelled past the inner limit of said neutral range in movement toward the inner end of its stroke, and there being a brake chamber port in the valve body opening into the outer end of the valved piston chamber.

5. A remote control valve for a fluid pressure brake system, comprising a valve body having piston chambers separated by an intermediate partition, a pair of mechanically interconnected pistons, one working in each of said chambers, there being an intake port and an exhaust port in the valve body at the outer end of one of said chambers, an outwardly seating exhaust valve controlling the exhaust port, an inwardly seating intake valve controlling the intake port, a compression spring acting outwardly on the outwardly seating exhaust valve and inwardly on the piston in the valved piston chamber, a compression spring acting inwardly on the inwardly seating intake valve and outwardly on the piston in the valved piston chamber, whereby said pistons are urged to move toward an intermediate neutral position in which both said valves are held seated by said springs, and valve actuating means moving with the piston in the valved piston chamber adapted to release and allow both said valves to close throughout a given neutral range of travel of said piston in the vicinity of said intermediate position, to unseat said intake valve against its spring when said piston has travelled past the outer limit of said neutral range in movement toward the outer end of its stroke and to unseat the exhaust valve against its spring when said piston has travelled past the outer limit of said neutral range in movement toward the inner end of its stroke, and there being a brake chamber port in the valve body opening into the outer end of the valved piston chamber, a control air port communicating with the inner end portion of the other piston chamber, and means through which a pressure may be applied on the outer side of the piston in the last mentioned piston chamber.

6. A remote control valve for a fluid pressure brake system, comprising a valve body having piston chambers separated by an intermediate partition, one of said chambers being of larger diameter than the other, a pair of mechanically interconnected pistons, one working in each of said chambers, there being an air port opening into the larger diameter piston chamber through which the pressure on the inner surface of the piston in said chamber can be controlled, and an air port opening into the outer portion of said chamber through which pressure may be applied to the outer side of said piston, there being an intake port and an exhaust port in the valve body at the outer end of the other piston chamber, an outwardly seating exhaust valve controlling the exhaust port, an inwardly seating intake valve controlling the intake port, a compression spring acting outwardly on the outwardly seating exhaust valve and inwardly on the piston in the valved piston chamber, a compression spring acting inwardly on the inwardly seating intake valve and outwardly on the piston in the valved piston chamber, whereby said pistons are urged to move toward an intermediate neutral position in which both said valves are held seated by said springs, and valve actuating means moving with the piston in the valved piston chamber adapted to release and allow both said valves to close throughout a given neutral range of travel of said piston in the vicinity of said intermediate position, to unseat said intake valve against its spring when said piston has travelled past the outer limit of said neutral range in movement toward the outer end of its stroke and to unseat the exhaust valve against its spring when said piston has travelled past the inner limit of said neutral range in movement toward the inner end of its stroke, and there being a brake chamber port in the valve body opening into the outer end of the valved piston chamber.

7. A remote control valve for a fluid pressure brake system, comprising a valve body having piston chambers separated by an intermediate partition, a pair of mechanically interconnected pistons, one working in each of said chambers, there being an intake port and an exhaust port in the valve body at the outer end of one of said chambers, an outwardly seating exhaust valve controlling the exhaust port, an inwardly seating intake valve controlling the intake port, inwardly extending valve stems on said valves, a valve actuating abutment on the piston in the valved piston chamber spaced outwardly from the outer end of said piston, a compression spring acting outwardly on the stem of the exhaust valve and inwardly on the abutment carrying piston, a compression spring acting inwardly on the stem of the intake valve and outwardly on said valve actuating abutment, said intake valve stem having a shoulder adapted to be engaged by said abutment to unseat the intake valve when the abutment carrying piston moves to the outer end of its stroke, said exhaust valve stem having a shoulder adapted to be engaged by said abutment to unseat the exhaust valve when said piston moves to the inner end of its stroke, and there being a brake chamber port in the valve body opening into the outer end of the valved piston chamber.

8. A remote control valve for a fluid pressure brake system, comprising a valve body having piston chambers separated by an intermediate partition, a pair of mechanically interconnected pistons, one working in each of said chambers, there being an intake port and an exhaust port in the valve body at the outer end of one of said chambers, an outwardly seating exhaust valve controlling the exhaust port, an inwardly seating intake valve controlling the intake port, inwardly extending valve stems on said valves, a valve actuating abutment on the piston in the valved piston chamber spaced outwardly from the outer end of said piston, a flange on each of said valve stems near the inner ends thereof, a compression spring encircling the intake valve stem and acting inwardly against the flange on said stem and outwardly against the valve actuating abutment, a compression spring acting outwardly on the exhaust valve stem flange and inwardly on the piston in the adjacent piston, said intake valve stem having a shoulder adapted to be engaged by said abutment to unseat the intake valve when the abutment carrying piston moves to the outer end of its stroke, said exhaust valve stem having a shoulder adapted to be engaged by said abutment to unseat the exhaust valve when said piston moves to the inner end of its stroke, and there being a brake chamber port in the valve body opening into the outer end of the valved piston chamber.

9. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, a pair of mechanically interconnected pistons, one working in each of said piston chambers, said control pressure line leading from the hand control valve being connected to the remote control valve to introduce air to one of said piston chambers to act on the inner surface of the piston therein, means for applying a pressure against the outer surface of said piston, there being an intake port, an exhaust port, and a brake chamber port opening into the outer end of the other of the piston chambers, normally seated valves controlling said intake and exhaust ports, yielding means tending to hold said pistons in a normal intermediate position in their respective chambers, means for opening the valve in the intake port when the piston in the corresponding chamber moves from said intermediate position to the outer end of its stroke, and for opening the valve in the exhaust port when said piston moves from its intermediate position to the inner end of its stroke, a pressure line between said brake chamber port and the brake chamber, and a pressure line between said auxiliary pressure tank and said intake port.

10. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, a pair of mechanically interconnected pistons, one working in each of said piston chambers, said control pressure line leading from the hand control valve being connected to the remote control valve to introduce air to one of said piston chambers to act on the inner surface of the piston therein, means for applying a pressure against the outer surface of said piston, there being an intake port, an exhaust port, and a brake chamber port opening into the outer end of the other of the piston chambers, an inwardly seating valve controlling the intake port and an outwardly seating valve controlling the exhaust port, a compression spring acting to hold the intake valve closed and to move the piston in the same chamber toward the outer end of its stroke, a compression spring acting to hold the exhaust valve closed and to move said piston toward the inner end of its stroke, whereby the pistons are yieldingly urged by said springs to stand normally in an intermediate position, means moving with the pistons adapted to open the intake valve as the piston in the same chamber moves to the outer end of its stroke, and to open the exhaust valve as said piston moves to the inner end of its stroke, a pressure line between the auxiliary reservoir and said intake port, and a pressure line between said brake chamber port and the brake chamber.

11. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, one of larger diameter than the other, a pair of mechanically interconnected pistons, one working in each of said piston chambers, said control pressure line leading from the hand control valve being connected to the remote control valve to introduce air to the larger of said piston chambers to act on the inner surface of the piston therein, means for applying a pressure against the outer surface of said piston, there being an intake port, an exhaust port, and a brake chamber port opening into the outer end of the other of the piston chambers, normally seated valves controlling said intake and exhaust ports, yielding means tending to move said pistons to an intermediate position in their respective chambers, means for opening the valve in the intake port when the piston in the corresponding chamber moves from said intermediate position to the outer end of its stroke, and for opening the valve in the exhaust port when said piston moves from its intermediate position to the inner end of its stroke, a pressure line between said brake chamber port and the brake chamber, and a pressure line between said auxiliary pressure tank and said intake port.

12. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, one of larger diameter than the other, a pair of mechanically interconnected pistons, one working in each of said piston chambers, said control pressure line leading from the hand control valve being connected to the remote control valve to introduce air to the larger of said piston chambers to act on the inner surface of the piston therein, means for applying a pressure against the outer surface of said piston, there being an intake port, an exhaust port, and a brake chamber port opening into the outer end of the other of the piston chambers, an inwardly seating valve controlling the intake port and an outwardly seating valve controlling the exhaust port, a compression spring acting to hold the intake valve closed and to press on the piston in the same chamber in the direction of the outer end of its stroke, a compression spring acting to hold the exhaust valve closed and to press on said piston in the direction of the inner end of its stroke, means moving with the pistons adapted to open the intake valve as the piston in the same chamber moves to the outer end of its stroke, and to open the exhaust valve as said piston moves to the inner end of its stroke, a pressure line between the auxiliary reservoir and said intake port, and a pressure line between said brake chamber port and the brake chamber.

13. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, a pair of mechanically interconnected pistons, one working in each of said chambers, said control pressure line leading from the hand control valve being connected to the remote control valve to introduce air to one of said piston chambers to act on the inner surface of the piston therein, a pressure conduit arranged to introduce air under reservoir pressure to the valve body to act against the outer surface of said piston, there being an intake port, an exhaust port, and a brake chamber port opening into the outer end of the other of the piston chambers, normally seated valves controlling said intake and exhaust ports, yielding means tending to move said pistons to an intermediate position in their respective chambers, means for opening the valve in the intake port when the piston in the corresponding chamber moves from said intermediate position to the outer end of its stroke, and for opening the valve in the exhaust port when said piston moves from its intermediate position to the inner end of its stroke, a pressure line between said brake chamber port and the brake chamber, and a pressure line between said auxiliary pressure tank and said intake port.

14. In a fluid trailer brake system, the combination with a main air pressure reservoir and a hand control valve on a leading vehicle, and an auxiliary air pressure reservoir and brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, a pair of mechanically interconnected pistons, one working in each of said piston chambers, said control pressure line leading from the hand control valve being connected to the remote control valve to introduce air to one of said piston chambers to act on the inner surface of the piston therein, a pressure conduit arranged to introduce air under reservoir pressure to the valve body to act against the outer surface of said piston, there being an intake port, an exhaust port, and a brake chamber port opening into the outer end of the other of the piston chambers, an inwardly seating valve controlling the intake port and an outwardly seating valve controlling the exhaust port, a compression spring acting to hold the intake valve closed and to press on the piston in the same chamber in the direction of the outer end of its stroke, a compression spring acting to hold the exhaust valve closed and to press on said piston in the direction of the inner end of its stroke, means moving with the pistons adapted to open the intake valve as the piston in the same chamber moves to the outer end of its stroke, and to open the exhaust valve as said piston moves to the inner end of its stroke, a pressure line between the auxiliary reservoir and said intake port, and a pressure line between said brake chamber port and the brake chamber.

15. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, one of larger diameter than the other, a pair of mechanically interconnected pistons, one working in each of said piston chambers, said control pressure line leading from the hand control valve being connected to the remote control valve to introduce air to the larger of said piston chambers to act on the inner surface of the piston therein, a pressure conduit arranged to introduce air under reservoir pressure to the valve body to act against the outer surface of said piston, there being an intake port, an exhaust port, and a brake chamber port opening into the other of the outer end of the piston chambers, normally seated valves controlling said intake and exhausts ports, yielding means tending to move said pistons to an intermediate position in their respective chambers, means for opening the valve in the intake port when the piston in the corresponding chamber moves from said intermediate position to the outer end of its stroke, and for opening the valve in the exhaust port when said piston moves from its intermediate position to the inner end of its stroke, a pressure line between said brake chamber port and the brake chamber, and a pressure line between said auxiliary pressure tank and said intake port.

16. In a fluid trailer brake system, the combination with a main air pressure reservoir and a hand control valve on a leading vehicle, and an auxiliary air pressure reservoir and a brake chamber on a trailer, said auxiliary pressure tank being connected with the main pressure reservoir, and said hand control valve controlling pressure in a control line leading from said main reservoir, of a remote control valve adapted to be mounted on the trailer, said remote control valve comprising a valve body having two piston chambers, one of larger diameter than the other, a pair of mechanically interconnected pistons, one working in each of said piston chambers, said control pressure line leading from the hand control valve being connected to the remote control valve to introduce air to the larger of said piston chambers to act on the inner surface of the piston therein, a pressure conduit arranged to introduce air under reservoir pressure to the valve body to act against the outer surface of said piston, there being an intake port, an exhaust port, and a brake chamber port opening into the outer end of the other of the piston chambers, an inwardly seating valve controlling the intake port and an outwardly seating valve controlling the exhaust port, a compression spring acting to hold the intake valve closed and to press the piston in the same chamber in the direction of the outer end of its stroke, a compression spring acting to hold the exhaust valve closed and to press on said piston in the direction of the inner end of its stroke, means moving with the pistons adapted to open the intake valve as the piston in the same chamber moves to the outer end of its stroke, and to open the exhaust valve as said piston moves to the inner end of its stroke, a pressure line between the auxiliary reservoir and said intake port, and a pressure line between said brake chamber port and the brake chamber.

17. A remote control valve for a fluid pressure brake system, comprising a valve body having piston chambers separated by an intermediate partition, a pair of mechanically interconnected pistons, one working in each of said chambers, means for applying a pressure on the outer end of the piston in one of the chambers, an air port communicating with the inner end of said chamber, through which pressure on the inner surface of said piston can be controlled, there being an intake port, an exhaust port and a brake chamber port in the valve body communicating with the outer end of the other of said piston chambers, an inwardly seating valve controlling said intake port, an outwardly seating valve controlling said exhaust port, a pair of compression springs in the last mentioned chamber acting to seat said valves, the spring that seats the inwardly seating intake port valve being arranged to act on the piston in the valved chamber to move it toward the outer end of its stroke, and the spring that seats the outwardly seating exhaust port valve being arranged to act on said piston to move it toward the inner end of its stroke, whereby the pistons normally take an intermediate neutral position, and means moving with the piston in the valved piston chamber adapted to open the intake port valve and allow the exhaust port valve to close as said piston moves to the outer end of its stroke and adapted to allow said intake port valve to close and to open the exhaust port valve as it moves to the inner end of its stroke.

18. A remote control valve for a fluid pressure brake system, comprising a valve body having two piston chambers, one of larger diameter than the other, a pair of mechanically connected pistons, one working in each of said chambers, means for applying a pressure on the outer end of the piston in the larger diameter piston chamber, an air port communicating with the inner end of said chamber, through which pressure on the inner surface of said piston can be controlled, there being an intake port, an exhaust port and a brake chamber port in the valve body communicating with the outer end of the other of said piston chambers, an inwardly seating valve controlling said intake port, an outwardly seating valve controlling said exhaust port, a pair of compression springs in the last mentioned chamber acting to seat said valves, the spring that seats the inwardly seating intake port valve being arranged to act on the piston in the valved chamber to move it toward the outer end of its stroke, and the spring that seats the outwardly seating exhaust port valve being arranged to act on said piston to move it toward the inner end of its stroke, whereby the pistons normally take an intermediate neutral position, and means moving with the piston in the valve piston chamber adapted to open the intake port valve and allow the exhaust port valve to close as said piston moves to the outer end of its stroke and adapted to allow said intake port valve to close and to open the exhaust port valve as it moves to the inner end of its stroke.

19. A remote control valve for a fluid pressure brake system, comprising a valve body having two piston chambers separated by an intermediate partition, one of said chambers being of larger diameter than the other, a pair of mechanically interconnected pistons, one working in each of said chambers, there being an air port opening into the larger diameter piston chamber through which the pressure on the inner surface of the piston in said chamber can be controlled, and an air port in the outer end of said chamber through which pressure air may be introduced to act on the outer surface of said piston, there being an intake port and an exhaust port in the valve body at the outer end of the other piston chamber, an outwardly seating exhaust valve controlling the exhaust port, an inwardly seating intake valve controlling the intake port, a compression spring acting outwardly on the outwardly seating exhaust valve and inwardly on the piston in the valved piston chamber, a compression spring acting inwardly on the inwardly seating intake valve and outwardly on the piston in the valved piston chamber, whereby said pistons normally take an intermediate neutral position in which both said valves are held seated by said springs, and valve actuating means moving with the piston in the valved piston chamber adapted to unseat said intake valve against its spring when said piston moves to the outer end of its stroke and to unseat the exhaust valve against its spring when said piston moves to the inner end of its stroke, and there being a brake chamber port in the valve body opening into the outer end of the valved piston chamber.

20. A remote control valve for a fluid pressure brake system, comprising a valve body having piston chambers separated by an intermediate partition, a pair of mechanically interconnected pistons, one working in each of said chambers, there being an intake port and an exhaust port in the valve body at the outer end of one of said chambers, an outwardly seating exhaust valve controlling the exhaust port, an inwardly seating intake valve controlling the intake port, inwardly extending valve stems on said valves, a valve actuating abutment on the piston in the valved piston chamber spaced outwardly from the outer end of said piston, a compression spring acting outwardly on the stem of the exhaust valve and inwardly on the abutment carrying piston, a compression spring acting inwardly on the stem of the intake valve and outwardly on said valve actuating abutment, said intake valve stem having a shoulder adapted to be engaged by said abutment to unseat the intake valve when the abutment carrying piston moves to the outer end of its stroke, said exhaust valve stem having a shoulder adapted to be engaged by said abutment to unseat the exhaust valve when said piston moves to the inner end of its stroke, there being a brake chamber port in the valve body opening into the outer end of the valved piston chamber, a control pressure port opening into the inner end of the other piston chamber, and a constant pressure port opening into the outer end of the last mentioned piston chamber.

21. A remote control valve for a fluid pressure brake system, comprising a valve body having two piston chambers separated by an intermediate partition, a pair of mechanically interconnected pistons, one working in each of said chambers, there being an intake port and an exhaust port in the valve body at the outer end of one of said chambers, an outwardly seating exhaust valve controlling the exhaust port, an inwardly seating intake valve controlling the intake port, inwardly extending valve stems on said valves, a valve actuating abutment on the piston in the valved piston chamber spaced outwardly from the outer end of said piston, a flange on each of said valve stems near the inner ends thereof, a compression spring encircling the intake valve stem and acting inwardly against the flange on said stem and outwardly against the valve actuating abutment, a compression spring acting outwardly on the exhaust valve stem flange and inwardly on the piston in the adjacent piston, said intake valve stem having a shoulder adapted to be engaged by said abutment to unseat the intake valve when the abutment carrying piston moves to the outer end of its stroke, said exhaust valve stem having a shoulder adapted to be engaged by said abutment to unseat the exhaust valve when said piston moves to the inner end of its stroke, there being a brake chamber port in the valve body opening into the outer end of the valved piston chamber, a control pressure port opening into the inner end of the other piston chamber, and a constant pressure port opening into the outer end of the last mentioned piston chamber.

22. A remote control valve for a fluid pressure brake system, comprising a valve body having piston chambers separated by an intermediate partition, a pair of mechanically interconnected pistons, one working in each of said chambers, substantially constant spring means acting to move said pistons toward an intermediate position in their respective chambers, means for applying a pressure on the outer end of the piston in one of the chambers, an air port communicating with the inner end of said chamber, through which pressure on the inner surface of said piston can be controlled, there being an intake port, an exhaust port and a brake chamber port in the valve body communicating with the outer end of the other of said piston chambers, and a pair of normally closed valves controlling said intake and exhaust ports, the valve controlling the intake port being opened by virtue of movement of the piston in the valved piston chamber from said intermediate position to a position in the direction of the outer end of its stroke and the valve controlling the exhaust port being opened by virtue of movement of the piston from said intermediate position to a position in the direction of the inner end of its stroke.

23. A remote control valve for a fluid pressure brake system, comprising a valve body having piston chambers separated by an intermediate partition, a pair of mechanically interconnected pistons, one working in each of said chambers, substantially constant means for applying a pressure on the outer end of the piston in one of the chambers, an air port communicating with the inner end of said chamber, through which pressure on the inner surface of said piston can be controlled, there being an intake port, an exhaust port and a brake chamber port in the valve body communicating with the outer end of the other of said piston chambers, an inwardly seating valve controlling said intake port, an outwardly seating valve controlling said exhaust port, a pair of compression springs in the last mentioned chamber acting to seat said valves, the spring that seats the inwardly seating intake port valve being arranged to act on the piston in the valved chamber to move it toward the outer end of its stroke, and the spring that seats the outwardly seating exhaust port valve being arranged to act on said piston to move it toward the inner end of its stroke, whereby the pistons normally take an intermediate neutral position, and means moving with the piston in the valve piston chamber adapted to open the intake port valve and allow the exhaust port valve to close as said piston moves to the outer end of its stroke and adapted to allow said intake port valve to close and to open the exhaust port valve as it moves to the inner end of its stroke.

24. A remote control valve for a fluid pressure brake system, comprising a valve body having two piston chambers, one of larger diameter than the other, a pair of mechanically connected pistons, one working in each of said chambers, means for applying a substantially constant pressure on the outer end of the piston in the larger diameter piston chamber, an air port communicating with the inner end of said chamber, through which pressure on the inner surface of said piston can be controlled, there being an intake port, an exhaust port and a brake chamber port in the valve body communicating with the outer end of the other of said piston chambers, an inwardly seating valve controlling said intake port, an outwardly seating valve controlling said exhaust port, a pair of compression springs in the last mentioned chamber acting to seat said valves, the spring that seats the inwardly seating intake port valve being arranged to act on the piston in the valved chamber to move it toward the outer end of its stroke, and the spring that seats the outwardly seating exhaust port valve being arranged to act on said piston to move it toward the inner end of its stroke, whereby the pistons normally take an intermediate neutral position, and means moving with the piston in the valved piston chamber adapted to open the intake port valve and allow the exhaust port valve to close as said piston moves to the outer end of its stroke and adapted to allow said intake port valve to close and to open the exhaust port valve as it moves to the inner end of its stroke.

25. In a fluid pressure brake system, the combination with a supply of pressure fluid and a brake chamber, of a control pressure system, means for controllably supplying said system with fluid from the pressure fluid supply, and for controllably exhausting fluid from said system, and brake pressure control means constantly biased to move in a first direction and directly subject to control system and to brake chamber pressure both applied thereagainst to tend to move said means in a second direction, resilient means yieldingly opposing displacement of said control means in both directions of travel from a neutral position intermediate the two limits of its travel, said control means being operatively responsive to decrease in pressure in the control system to move from said neutral position in said first direction to a position in which pressure fluid is passed from the pressure supply to the brake chamber, and to resulting increase in brake chamber pressure to return to neutral position to interrupt such flow of fluid to the brake chamber when brake chamber pressure has risen sufficiently to make up for decreased control system pressure on the control means, said control means also being operatively responsive to subsequent increase in pressure in the control system to move from neutral position in said second direction to a position in which fluid is discharged from the brake chamber, and to resulting decrease in brake chamber fluid pressure to return to neutral position to interrupt discharge of fluid from the brake chamber when brake chamber pressure has decreased sufficiently to compensate for the effected increase of control system pressure on the control means.

26. In a fluid pressure brake system, the combination with a supply of pressure fluid and a brake chamber, of a control pressure system, means for controllably supplying said system with fluid from the pressure fluid supply, and for controllably exhausting fluid from said system, piston means pressure actuated to move in one direction, means applying fluid from the control system to act on said piston to tend to move it in the opposite direction, spring means yieldingly acting in opposite directions on said piston means to tend to return said piston means toward an intermediate normal position when displaced therefrom in either direction of its travel, said pressure-actuated piston means being actuated to move in said one direction from said normal position when the control pressure is decreased, means subjecting said piston means to brake chamber fluid pressure, in such direction as to tend to move the piston means in said opposite direction, means supplying pressure fluid to the brake chamber from the pressure fluid supply, normally closed valve means controlling said means and adapted to be opened by the piston means at a given point in said travel of said piston means in said one direction, discharge means for passing brake chamber pressure fluid to atmosphere, and normally closed valve means controlling said discharge means and adapted to be opened by the piston means at a point in the travel of said piston means in said opposite direction located at a given distance beyond the point of closure of said first mentioned valve means, whereby the piston means has a latitude of travel in the vicinity of said neutral position between the two points at which said two valve means are opened thereby.

27. In a fluid pressure brake system, the combination with a supply of pressure fluid and a brake chamber, of a control pressure system, means for controllably supplying said system with fluid from the pressure fluid supply, and for controllably exhausting fluid from said system, a reciprocable piston means having a fluid pressure area, means applying fluid from the supply of pressure fluid against said piston area to move the piston means in one direction, a fluid pressure area on the piston means facing oppositely to the first named pressure area, means applying fluid from the control system to act on said last named pressure area to tend to move the piston means in the opposite direction, yielding means acting in opposite directions on said piston means to tend to return said piston means toward an intermediate neutral position when displaced therefrom in either direction of its travel, said piston means being pressure actuated to move in said one direction when the control pressure is decreased, another fluid pressure area on said piston means, facing in the same direction as the second named pressure area, means subjecting said last named piston area to brake chamber fluid pressure, means supplying pressure fluid to the brake chamber from the pressure fluid supply, normally closed valve means controlling said means and adapted to be opened by the piston means at a given point in said travel of said piston means in said one direction, and to be closed at a corresponding point in the return travel of said piston means back toward said neutral position, discharge means for passing brake chamber pressure fluid to atmosphere, and normally closed valve means controlling said discharge means and adapted to be opened by the piston means at a point in the travel of said piston means in said opposite direction located a given distance beyond the point of closure of said first mentioned valve means, whereby the piston means has a latitude of travel in the vicinity of said neutral position between the two points at which said two valve means are opened thereby.

28. In a fluid pressure brake system, the combination with a supply of pressure fluid and a brake chamber, of a control pressure system, means for controllably supplying said system with fluid from the pressure fluid supply, and for controllably exhausting fluid from said system, a reciprocable piston means having a fluid pressure area, means applying fluid from the supply of pressure fluid against said piston area to move the piston means in one direction, a fluid pressure area on the piston means facing oppositely to the first named pressure area, means applying fluid from the control system to act on said last named pressure area to tend to move the piston means in the opposite direction, said piston means taking a normal intermediate position under the influence of full control system pressure, yielding means tending to hold said piston means normally in said intermediate position, said piston means moving under the influence of the pressure fluid on its first named pressure area, against said yielding means, in said one direction from said normal position when the control pressure is decreased, another fluid pressure area on said piston means, facing in the same direction as the second named pressure area, means subjecting said last named piston area to brake chamber fluid pressure, means supplying pressure fluid to the brake chamber from the pressure fluid supply, normally closed valve means controlling said means and adapted to be opened by the piston means when said piston means travels from said intermediate position in said one direction, discharge means for passing brake chamber pressure fluid to atmosphere, and normally closed valve means controlling said discharge means and adapted to be opened by the piston means when said piston means travels in said other direction from said intermediate normal position.

29. A remote control valve for a fluid pressure brake system, comprising a valve body having piston chambers, a piston means reciprocable therein, said piston means having one fluid pressure area facing in one direction and two fluid pressure areas facing in the opposite direction, three fluid ports opening into the piston chamber that contains one of the two fluid pressure piston areas that face in the same direction, two of said ports normally being closed, one of the latter being opened by the piston means when moved a given distance in one direction from an intermediate position of its stroke, and the other of the two normally closed ports being opened by the piston means when moved a given distance in the other direction from said intermediate position, spring means yieldingly opposing displacement of said piston means in both directions from said intermediate position and acting to restrain overtravel of said piston means after returning to said intermediate position, and ports through which fluid pressures may be applied to the other two pressure areas on the piston means.

30. In a fluid pressure brake system, the combination with a supply of pressure fluid and a brake chamber, of a piston chamber, three fluid ports opening within said chamber, a fluid conduit between one of the ports and the pressure fluid supply, a fluid conduit between another of the ports and the brake chamber, and a conduit discharging to atmosphere from the other of the ports, piston and fluid port controlling means in said chamber adapted to open the port connected with the pressure fluid supply when at one position in the chamber, to close said port and open the port discharging to atmosphere when at another position in the chamber, and to close both the last mentioned port and the port connected to the pressure fluid supply when in an intermediate position in the chamber, resilient means yieldingly opposing displacement of said piston means in both directions of travel from said intermediate position, control means comprising a second chamber and piston means, an operative interconnection between the first and second piston means, means applying a force tending to move the two operatively interconnected piston means in such directions as to cause the fluid port connected to the pressure fluid supply to be opened, and means controllably supplying pressure fluid from the pressure fluid supply to the second piston means in such direction as to oppose such movement of the two piston means, and for controllably releasing said pressure fluid so acting on the second piston means.

AVAD L. FARMER.